United States Patent [19]

Beranek et al.

[11] 4,226,835

[45] Oct. 7, 1980

[54] FLUIDIZED-BED SEAL

[75] Inventors: Jaroslav Beránek, Prague; Dobromil Pihert; Oleg Engel, both of Kladno, all of Czechoslovakia

[73] Assignee: Ceskoslovenska akademie ved, Prague, Czechoslovakia

[21] Appl. No.: 56,846

[22] Filed: Jul. 12, 1979

[30] Foreign Application Priority Data

Jul. 20, 1978 [CS] Czechoslovakia ............... 4866-78

[51] Int. Cl.$^2$ ............... B01J 8/44; F26B 25/00; F26B 17/10; B65G 65/00

[52] U.S. Cl. ............... 422/310; 34/15; 34/56; 34/57 A; 34/57 B; 34/242; 414/292; 414/293; 422/143; 422/145

[58] Field of Search ............... 422/142, 143, 145, 147, 422/310; 34/15, 56, 57 A, 57 B, 57 R, 242; 414/292, 293

[56] References Cited

U.S. PATENT DOCUMENTS

| | | | |
|---|---|---|---|
| 3,010,215 | 11/1961 | Kayatz | 34/242 X |
| 3,158,449 | 11/1964 | Opila | 34/242 X |
| 3,172,755 | 3/1965 | Vian-Ortuno et al. | 422/142 X |
| 3,648,380 | 3/1972 | Guilloud | 34/57 A X |
| 4,010,002 | 3/1977 | Degel et al. | 422/145 X |

FOREIGN PATENT DOCUMENTS 820447 9/1959 United Kingdom ............... 422/143

OTHER PUBLICATIONS

Perry, J. H., Chemical Engineers' Handbook, 4th Ed., McGraw-Hill, 1963, pp. 20-46-20-48.

Primary Examiner—Barry S. Richman
Attorney, Agent, or Firm—Burgess, Ryan and Wayne

[57] ABSTRACT

A fluidized-bed seal, formed by a vertical vessel divided with a baffle into two parts, closed at the upper end and having a fluidization grid situated at the lower end of the vessel, two vertical pipes which extend into the upper part of the vessel for inlet and outlet of particles and two pipes situated in the upper part of the vessel for inlet of secondary fluid, the cross sectional area of the fluidization grid being from 30 to 100% of the cross sectional area of the upper part of the vessel. The pipes for the inlet and outlet of particles extend into the upper part of the vessel from one to about three diameters of the pipes. The fluidized-bed seal can be used for continuous transport of cracking catalyst into the fluidization reactor.

4 Claims, 1 Drawing Figure

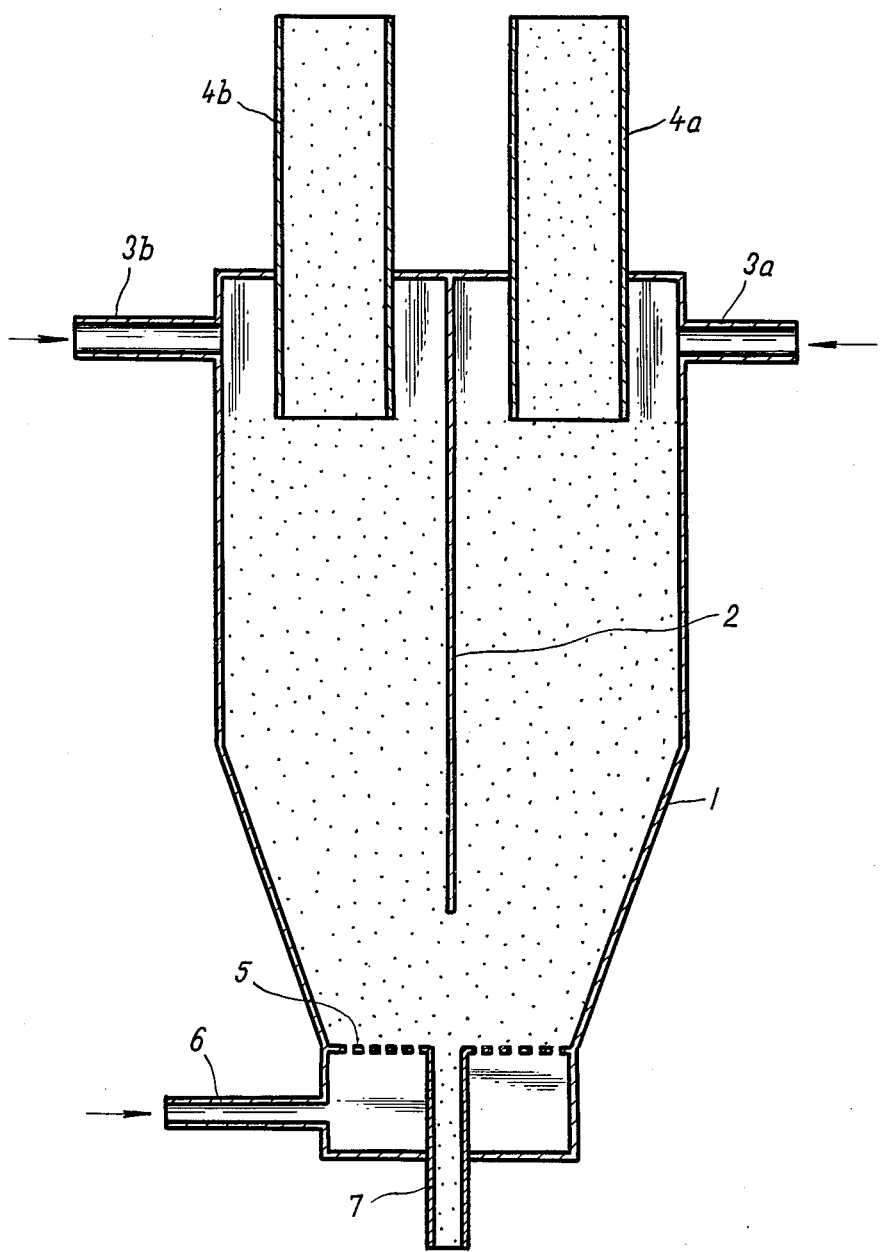

FLUIDIZED-BED SEAL

The invention relates to the fluidized-bed seal and feeding device for particles for discharge and filling of powdery material into storage tanks and fluidization devices.

At the present time two types of fluidized-bed seals are used. The seals are described, e.g., in the Chemical Engineer's Handbook (McGraw Hill, New York, 4th Edition, page 20-47 to 20-48).

The first type of the fluidized-bed seal is used for discharge of powdery material from fluidization reactors and is usually situated below the bottom of the fluidization reactor. This fluidized-bed seal consists of a vertical cylindrical vessel divided into two parts by a vertical baffle. The upper part of the seal between the vertical baffle and the cylindrical vessel is closed by a horizontal or slant head below which an overflow pipe is attached to the cylindrical vessel for discharge of particles. The open part of the upper end of the vertical cylindrical vessel is connected to the fluidization reactor or with a vessel of powdery material by vertical pipes. The fluidizing fluid is introduced below the baffle at a distance approximately equal to the diameter of the vertical vessel.

After filling the fluidized-bed seal with particles of powdery material from the fluidization reactor or from a vessel and, after introduction of the fluidization fluid into the bottom of the seal, the powdery material in both parts of the cylindrical vessel starts to fluidize and overflows down the overflow pipe. When the flow of the fluidizing fluid into the bottom of the seal is stopped, the particles stop to fluidize and the discharge of powdery material stops.

The disadvantage of this type of fluidized-bed seal is that it can be used only for discharge of powdery material and it is not possible to control the flow rate of powdery material through the seal.

The second type of the fluidized-bed seal consists of a vertical pipe which is closed on the lower end. Above the bottom of this pipe is a horizontal discharge spout whole length is chosen so that particles poured into the vertical pipe do not pass down the spout.

After introduction of the fluidization fluid into the vertical pipe through the inlet situated at a selected height above the horizontal discharge spout, the fluid stream is divided into two branches, one of which flows upward through the vertical pipe and the second one flows first downwards and then through the horizontal discharge spout into the space outside the seal. The ratio of volume flow rates of the fluidizing fluid to each branch depends on the pressure drop of the bed of particles above and below the inlet of fluidization fluid into the vertical pipe. When the velocity of the fluid in the horizontal discharge spout exceeds the limiting value, determined by the size, shape and specific density of particles and porosity of the powdery material, the particles pass through the horizontal discharge spout. This is accompanied by a decrease in the height of the bed of particles and by a decrease in pressure drop of the bed above the inlet of the fluidizing fluid into the vertical pipe. This causes an increase in the flow rate of fluid in the upper part of the vertical pipe and simultaneously a decrease in the flow rate in the horizontal discharge spout. At the decrease of the flow rate in the horizontal discharge spout below the limiting value, the outlet of the powdery material from the seal stops.

This type of seal can be used for discharge of vessels for powdery material, of equipment filled with powdery materials as well as for the continuous inlet pf particles from a space at lower static pressure into a space at a higher static pressure when the particles of powdery material are continuously fed to the surface of the bed in the vertical vessel.

The disadvantage of this simple method for introducing particles into a space at higher pressure is that the level fluctuation in the vertical pipe is great due to differing values in the coefficient of internal friction of powdery material when at rest or in motion. The fluctuation of the surface of the bed causes irregularities in feeding of the powdery material. Another disadvantage is the sensitivity of the seal to fluctuations of static pressure in front of or behind the seal which can lead to uncontrollable flow rates of particles through the seal and very frequently to its failure.

BRIEF DESCRIPTION OF THE INVENTION

The disadvantages of known seals are eliminated by the fluidized bed seal of the present invention comprising a vertical vessel divided with a vertical baffle into two parts, closed at the upper end and having a grid at the lower end, two vertical pipes submerged into the upper part of the vessel for inlet and outlet of particles and two pipes for the inlet of secondary fluid, while while the cross sectional area of the fluidization grid is from 30 to 100% of the cross sectional area of the upper part of the vessel and the depth of submergence of the vertical pipes for the inlet and outlet of particles is equal to from about one up to three diameters of these pipes. The pipes for the inlet of the secondary fluid are connected to the upper part of the vessel in the space limited by the horizontal plane passing through the lower ends of pipes and the vessel cover.

The proposed fluidized-bed seal enables continuous feeding of particles into a space at higher static pressure, as compared to the pressure at the inlet of particles into the fluidized-bed seal, as well as the flow of powdery material through the fluidized-bed seal in the selected direction.

BRIEF DESCRIPTION OF THE DRAWING

The FIGURE is a cross-section of an embodiment of the seal of the present invention.

DETAILED DESCRIPTION OF THE INVENTION

The design of the fluidized-bed seal according to the invention is illustrated in the attached FIGURE. The vessel 1 of the fluidized-bed seal which can be, e.g., of circular or polygonal shape in the horizontal cross section, is divided by baffle 2 into two parts. The upper part of the vessel 1 is closed by a cover through which pass pipes 4a and 4b for the inlet and outlet of particles. The pipes 4a and 4b extend below the cover of the jacket 1 where they form spaces restricted by the cover of the vessel 1 and by the lower ends of pipes 4a and 4b which are filled with powdery material. With this space, the ends of pipes 3a and 3b communicate for the inlet of the secondary fluid.

The lower part of the vessel 1, which generally has a smaller cross section than the upper part of the vessel, has a grid 5 for the inlet of fluidization fluid, introduced by the pipe 6 into the chamber below the grid 5. If needed, particles of powdery material can be discharged from the fluidized-bed seal through pipe 7.

Two of the many possible ways to use the fluidized-bed seal according to this invention are illustrated by the following examples.

The fluidized-bed seal shown on the attached FIGURE was used for transport of the cracking catalyst with a particle size up to 0.5 mm between a storage vessel and fluidization reactor which was situated below the storage vessel. Storage vessel was connected to pipe 4b, the fluidization reactor to pipe 4a. After filling the storage vessel with powdery material, particles of this material filled the space of the fluidized-bed seal below pipe 4b. After opening the air inlet into pipe 6, particles in the fluidized-bed seal started to fill the seal and overflow through pipe 4a into the fluidization reactor. The rate of flow of particles could be controlled within the range from 500 to 2500 kg/hr by secondary air which was fed into the fluidized-bed seal by inlet 3a which accelerated the flow rate of particles or through inlet 3b which slowed down the flow rate of particles.

After filling the fluidization reactor with the cracking catalyst, the flow of air to pipe 6 was stopped and the flow of particles through the fluidized-bed seal stopped. To prevent leakage of the gaseous reaction mixture from the reactor through the fluidized-bed seal, a small amount of air was continuously fed through pipes 3a and 3b.

The transport of particles from the fluidization reactor into the storage vessel was arranged so that with air to inlet 6 closed, there was at first introduced through pipe 3b an amount of air which caused the particles 4b in the pipe to fluidize. The flow rate of air at inlet 6 was then continuously increased until the particles started to flow through the fluidized-bed seal. The flow rate of particles in the direction from the fluidization into the storage vessel was controlled by the amount of air in inlet 3b.

In another case, the fluidized-bed seal of the same dimensions was used for continuous introduction of particles into the fluidization reactor in which the static pressure was higher than the static pressure above the upper surface of particles in the inlet pipe 4a of the fluidized-bed seal into which the particles were fed.

The inlet of the fluidizing medium into pipe 3a was closed. Through pipe 6 the velocity of fluid, when related to the free cross sectional area of vessel 1 in the point of outlet of pipes 4a and 4b, was twice the incipient fluidization velocity. The height of the column of particles in pipe 4a and consequently the static pressure of the fluidization at inlet 6 was controlled by the fluidization fluid introduced through pipe 3b. At the increase of the volumetric flow rate of fluid in pipe 3b, the level of fluidization bed in pipe 4a decreased.

We claim:

1. A fluidized-bed seal comprising: a vertical vessel divided into two parts by a vertical baffle, said vessel being closed at the upper end and having a fluidization grid situated at the bottom end thereof for introduction of fluidizing medium, said baffle extending from the closed upper end of said vessel to a location above and vertically spaced from said grid, a pair of vertical pipes each of which enters the vessel through the top thereof with said pair of vertical pipes being located on opposite sides of the baffle and extending into an upper part of the vessel, for the respective inlet and outlet of particles, and a pair of secondary fluid inlet pipes, each of said pair of secondary fluid inlet pipes being located to communicate with the vessel at a different one of said two parts of said vessel.

2. A fluidized-bed seal according to claim 1, wherein the cross sectional area of the fluidization grid is from about 30 to 100% of the cross sectional area of said upper part of vessel.

3. A fluidized-bed seal according to claim 1, wherein each of the vertical pipes extends into the upper part of the vessel for a distance equal to from about one to three diameters of the pipe.

4. A fluidized-bed seal according to claims 1 or 3 wherein the inlet pipes for the secondary fluid communicate with the upper part of the vessel in the region limited by the horizontal plane passing through lower ends of the vertical pipes and the upper closed end of the vessel.

* * * * *

UNITED STATES PATENT AND TRADEMARK OFFICE
CERTIFICATE OF CORRECTION

PATENT NO. : 4,226,835
DATED : October 7, 1980
INVENTOR(S) : Jaroslav Beranek, et al It is certified that error appears in the above—identified patent and that said Letters Patent is hereby corrected as shown below:

Column 2, line 3: "pf" should be --of--.

line 28: Delete "while".

Signed and Sealed this

Twelfth Day of May 1981

[SEAL]

Attest:

RENE D. TEGTMEYER

Attesting Officer

Acting Commissioner of Patents and Trademar